Jan. 16, 1968 R. J. MAHEUX 3,364,487

PORTABLE RADIO RECEIVER ANTENNA COUPLER SET

Filed Dec. 1, 1964 2 Sheets-Sheet 1

INVENTOR
Rosario J. MAHEUX

ATTORNEYS

INVENTOR
Rosario J. MAHEUX

ATTORNEYS

United States Patent Office 3,364,487
Patented Jan. 16, 1968

3,364,487

PORTABLE RADIO RECEIVER ANTENNA COUPLER SET

Rosario J. Maheux, 6414 St. Laurent Blvd., Montreal, Quebec, Canada

Filed Dec. 1, 1964, Ser. No. 415,027
3 Claims. (Cl. 343—702)

ABSTRACT OF THE DISCLOSURE

An antenna coupler set for a radio receiver for use in an automotive vehicle, the set consisting of a portable shielded casing having an antenna coupler including a ferrite core over which an induction coil is wound, the coupler being mounted in the casing. One end of the induction coil is connected to a plug and the other end to ground. The casing is constructed to receive a radio receiver having a receiving antenna to be disposed in facing relationship with the ferrite member.

The present invention relates to an antenna coupler set for a portable radio receiver and more particularly such a set specially shielded for use in a vehicle, that is, one wherein the radio receiver is protected against interference due to the surrounding vehicle body and is rendered non-unidirectional.

There are presently on the market radio receivers specially constructed to be mounted and used in vehicles while being portable units outside the vehicle. Commonly called "auto-portables," these receivers are competitive with conventional car radios and are often comparable in prices. Besides being expensive, this arrangement lacks flexibility as each auto-portable receiver is associated with its own specific mounting rack or bracket and interchangeability of receiver or bracket can take place only with the duplicate of original equipment. Also on the market are small portable receivers, usually battery-operated transistor sets of the pocket type variety that are much less expensive but are restrictive in use in that they cannot be operated efficiently inside a vehicle because of the interference caused by the vehicle body and also because they are highly directional.

It is common knowledge that it is impractical to receive radio signals inside a vehicle with the present-day portable receiver, due, in part, to a lack of signal strength for satisfactory operation of the receiver. The vehicle body acts as a partial shield or screen and so prevents the radio signals from reaching the receiver antenna with sufficient strength. This effect becomes more complex and noticeable when the vehicle is in motion because the vehicle body is not uniform in its make-up, being composed of steel, aluminum, plastic, glass, canvas, etc. Different parts of the vehicle body, which are the receiver immediate surroundings, are indiscriminately inserted between the broadcasting station transmitting antenna and the portable receiver antenna so that the presence of such a variable and unpredictable pattern of shielding results in the radio signal reception being degraded and erratic. Unless certain provisions, which are the objects of the present invention are adhered to, an ordinary portable receiver by itself is not designed and is not intended to be efficient when vehicle-borne.

Also, if the receiver is shifted away from the direction of best reception, its ability to pick up radio signals from that particular broadcasting station changes considerably, while reception conditions improve for adjacent radio stations causing inter-station interference. This is precisely what happens when a portable receiver is used in a vehicle in motion unless the receiver is continually reoriented.

Even this procedure, which is far from being practical, would not cancel the shielding effect caused by the vehicle parts. Most of the portable receivers in use today are equipped with built-in ferrite core antennas and apart from the high permeability of their ferrite cores, one of their main characteristics is that they possess a highly directional effect which the manufacturers keep on improving, claiming that a built-in ferrite direction-finder antenna makes good reception possible at any time.

It is obvious that both effects are undesirable for satisfactory operation of any portable receiver inside a vehicle and the net result is reception impairment: fading, blasting, static, etc. Even the best designed portable receiver, equipped with the most elaborate and effective AVC or AGC system would be unable to cope with such an odd combination of adverse conditions. The AVC–AGC feature contributes within limits to compensate for some intensity changes of signal reception when the receiver is operated in areas of fairly good signal strength, but its effectiveness is always limited because there are too many variables involved. Under weak signal conditions either real or artificial, the interference picked up by the antenna system and amplified through the action of the AVC–AGC often clouds the desired signals. Static, hissing sounds, background noises in the audio output is the result. If the receiver is without any AVC–AGC system, such results are even more pronounced. Most of the portable receivers sold today at so-called popular prices are not equipped with any kind of AVC–AGC system.

The current practice to overcome the "shielding" effect is by installing an outside antenna which connects directly into the receiver by means of a coaxial cable, and the "directional" effect by substituting the ferrite loopstick antenna by a standard antenna transformer when the receiver is used inside a vehicle. This is done in a number of ways, e.g. when the receiver is introduced or slid into its mounting rack or bracket or when the outside antenna lead-in plug is inserted into its receptacle or under the control of a switch.

It is consequently a main object of the invention to adapt such small low cost portable radio receivers for use in a vehcle, that is adapted so that they will not be affected by the surrounding metal body nor will they be limited in operation when oriented in one direction only.

Another object of this invention is to provide an effective means of greatly mproving the reliability and performance of any AM and/or FM portable radio receiver when operated inside a vehicle without undue variations or deteriorations of audible signals and whether the vehicle is stationary or in motion, this result being obtained without any modification or attachment to the portable receiver.

Still another object of the invention resides in the provision of a shielded antenna coupler set comprising a shielded casing wherein the radio receiver is merely placed in the casing to make it operable in the manner indicated above without having to make any connection whatever between the receiver and the casing.

Yet another object of the invention is to provide a set of the above type having a cover equipped with a conically shaper finger well for the operation of the receiver knobs, the cover being so formed that it can be used whether the operating knobs are along the same edge as the receiver antenna or on an adjacent edge.

The above objects are attained by inserting the portable receiver inside a shielding container or shell, the said shell acting like a screen or shield bypasses any flux therethrough and so prevents it from affecting the receiver. Thus, any stray magnetic field, any radio signals and traces of signals are automatically excluded from the container and the receiver is virtually shielded from any outside interference and electrical disturbances. Radio signals are picked up and are channelled to the radio receiver antenna only through the use of a hybrid antenna which has as counterpoise the whole metallic structure of the vehicle body including the metallic coupler casing and the lead-in coaxial cable sheathing. The hybrid antenna consists of an isotropic or omnidirectional antenna (mounted outside the vehicle) connected to a suitable frequency band ferrite core antenna which is mounted inside but away from the coupler casing by means of two supports made of insulating material such as plastic or fiber. The ferrite core antenna is mounted away from the coupler casing to keep flux leakage through it to a minimum. The receiver is placed inside the container to have its antenna close to and parallel with the coupler antenna and both antennas effectively converted into the equivalent of a standard RF antenna transformer and behaving the same way, are positioned (the coupler incorporates all the necessary means to adjust the coupled coil over its "tiltable" core and the whole coupler assembly against the receiver antenna and vice versa) to derive the greatest amount of coupling between the two without disturbing appreciably the critical resonance equation of the receiver tuning elements. The proper amount of padding between casing and receiver serves to adjust and immobilize the latter in place once the point of best coupling has been established. The padding serves also to protect the fragile receiver against mechanical vibrations and shocks. The whole coupler can be mounted at any accessible and convenient location inside the vehicle. That location will usually be the instrument board (dashboard). Two self-threading screws through the rear of the casing are sufficient for most installations.

In a preferred embodiment of the invention, a square cover is removably secured on an open top of the casing, the said cover having holes therethrough adapted to face the loudspeaker of the radio to allow sound therethrough as well as a finger well means mounted on and extending through the cover to give access to the control knobs located mostly along one edge of the radio receiver. The cover is made square whereby should the receiver control knobs be located along a different edge from that of the receiver antenna, the cover needs only be turned 90° whereby it may be given access to the knobs.

Although only a square opening and appropriate cover are referred to in the drawings and description, a round opening and cover properly threaded are used with the same results. Either arrangement provides versatility.

A better understanding of the invention will be afforded by the description that follows of a preferred embodiment having reference to the appended drawing, wherein.

It is to be understood that whenever the expression "radio receiver" is used in this specification, it is meant any kind of receivers including those used in signalling or paging systems.

Figure 1:
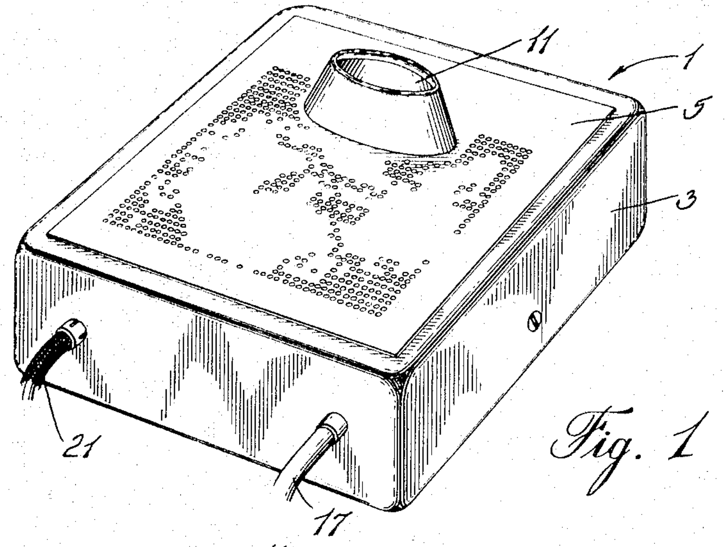
FIG. 1 is a perspective view of a radio receiver antenna coupler set made according to the invention.
Figure 2:
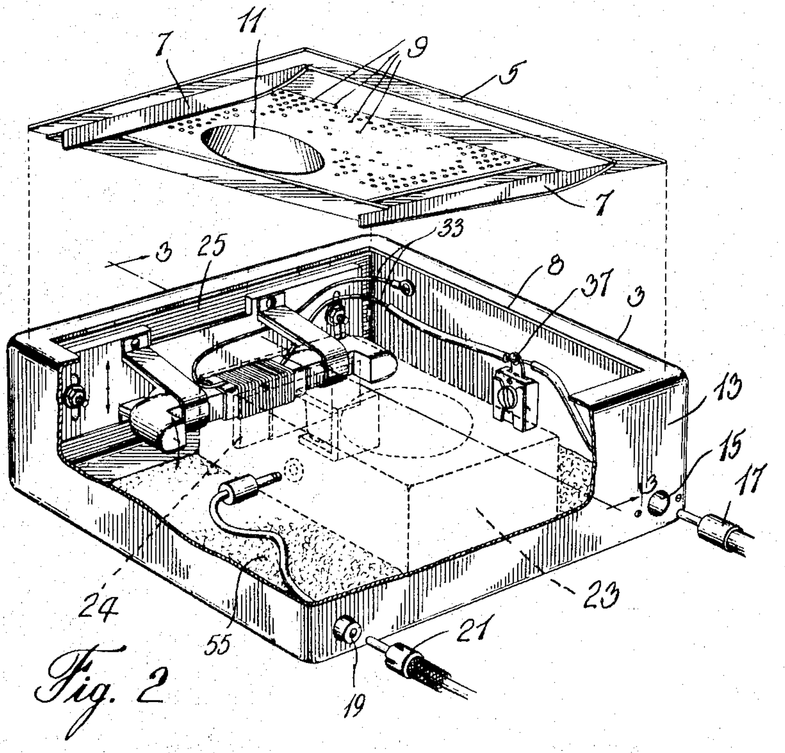
FIG. 2 is a perspective view with cover removed and with certain walls cut off to show the internal structure of a set for a radio receiver, the latter being shown in dotted lines.

As shown in FIGS. 1 and 2, the coupler set of the invention comprises an outer shielding shell or casing 1 preferably made of electro-conductive material, and formed of an open top container 3 adapted to be closed by a cover 5 especially formed with depending flanges 7 to guide the cover in position over container opening 8.

It will be noted that cover 5 is provided with a plurality of holes 9 therethrough for the transmission of sound as well as with a finger well 11 to be referred to again later.

A front wall 13 of container 3 has a connection 15 for the reception of an antenna lead-in plug 17 adapted to place the coupler antenna in connection with the outside vertical antenna of the vehicle and a speaker connection 19 for the reception of a speaker lead-in plug 21 adapted to connect the speaker of the vehicle with the radio receiver if desired.

Figures 3, 4, 5, 6:
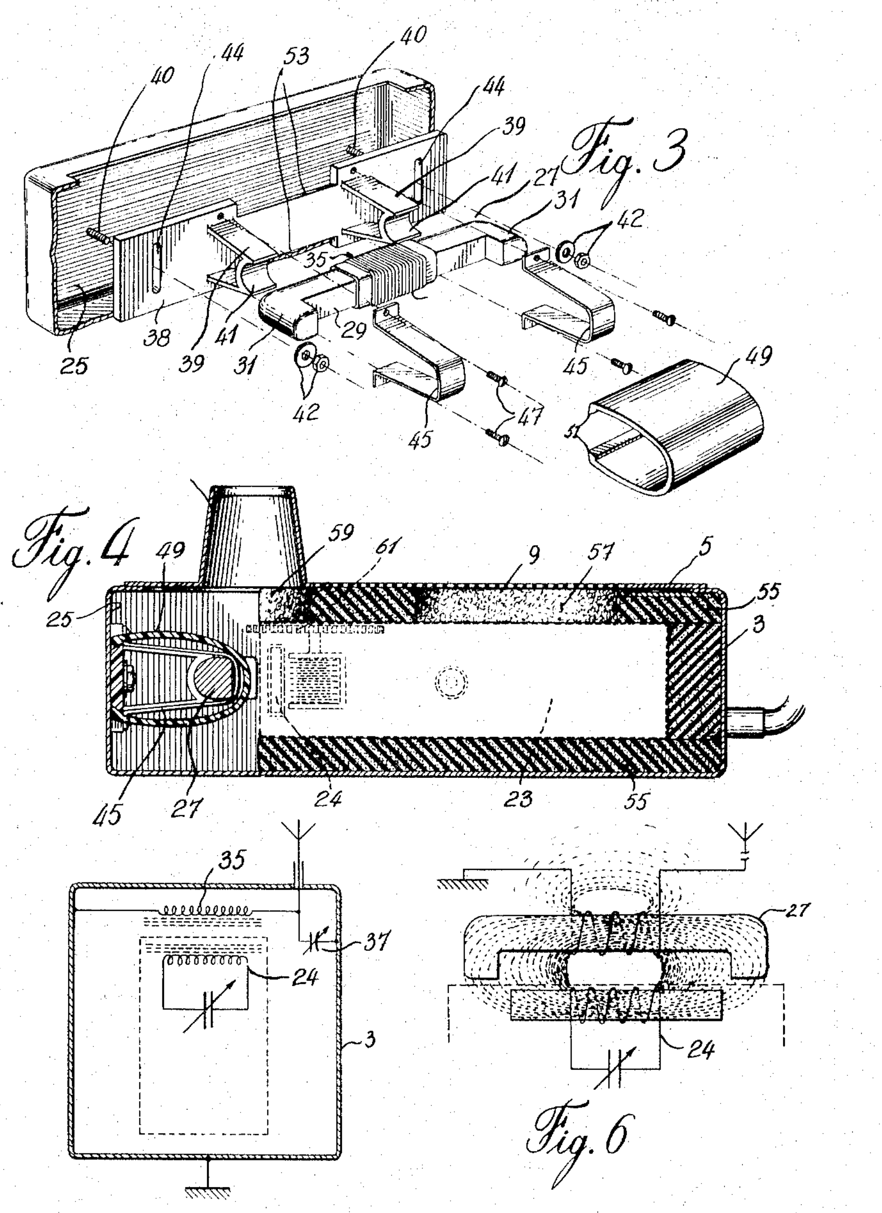
FIG. 3 is an exploded view of the ferrite antenna coupler of the set of the invention.
FIG. 4 is a cross-section view taken along line 3—3 of FIG. 2.
FIGS. 5 and 6 are respectively an electrical and a magnetic diagram of the coupler ferrite core antenna and the tuning elements of the radio receiver, constituting a true duplicate of a standard radio frequency untuned-primary tuned-secondary circuit.

A conventional portable radio receiver 23 is mounted in container 3 as shown in dotted lines in FIGS. 2 and 4, the said radio receiver having an antenna 24 along a top edge thereof, usually a ferrite core antenna.

Between the top end of the receiver 23 and the rear wall 25 of casing 3 is disposed an antenna coupler formed of a U-shaped ferrite member 27 (see FIG. 3) having a central part 29 and a pair of lateral leg parts 31 and a metal wire 33 wound around central part 29 to form a coil 35, one end of which is grounded to the container 3 while the other end is connected to the outside antenna connector 15, the antenna trimmer 37 being connected in the usual manner.

A support of electrically insulating material such as a plastic is provided for supporting the ferrite antenna coupler 27 and is secured to the rear wall 25 of casing 3 so that the ferrite antenna coupler 27 faces the antenna 24 of the portable receiver.

In one form of the invention, the said support is a stirrup bracket having plate 38 on which is provided a pair of spaced lateral lugs 39 each formed with a half-circular seat 41 (see FIG. 3) facing the radio receiver and adapted to receive the central part 29 of the ferrite member 27. The mounting means for retaining the ferrite member 27 against the bracket lugs 39 consists of a pair of flexible non-metallic bands 45 mounted in facing relationship with the seats 41 of lugs 39. Clamping elements 45 are removably secured to the plate 38 by any convenient means such as screws 47. It will be seen from this description that the ferrite member 27 may thus be retained in any desired orientation in the lugs 39 of the mounting bracket. This is convenient because, in different conventional portable receivers, the antenna may be mounted as shown in FIGS. 2 and 4 or above or below that location. Plate 38, in turn, is fastened to rear wall 25 by screws 40 and washers and nuts 42 extending across elongated vertical slots 44 through plate 38. With a support of this type, ferrite core 27 of the antenna coupler may be shifted bodily vertically to align it with antenna 24 of receiver 23. A horseshoe-shaped plastic cover 49 (FIG. 3) is mounted over the assembly by means of sharp edges 51 snapped into receiving notches 53 of plate 38. Thus, the means mounting antenna coupler 27 on the support therefor is such that the central part 29 and the leg parts 31 are directed toward the ferrite core 24 of the receiver antenna to form therewith a closed magnetic loop which is particularly illustrated in FIG. 6.

As shown more particularly in FIG. 4, pads are mounted along the inner surfaces of casing 3 and on the inner surface of cover 5 to keep the receiver 23 spaced from the casing 3 and cover 5. However, apertures 57 and 59 are provided respectively for the passage of sound from receiver 23 and for the passage of fingers adapted to extend through the finger well 11. Preferably, the pads 55 are made of foam rubber or similar spongy material.

As mentioned previously, cover 5 of the casing 3 is square in shape so that it may always be disposed over the receiver control knobs 61 regardless of whether the said knobs 61 are along the same edge of the receiver as the antenna 24, such as in FIG. 4, or are on an edge at right angle thereto.

Although a specific embodiment has just been described, it will be understood that various modifications may be made thereto without departing from the spirit of the invention, the scope of which is set forth in the appended claims.

I claim:

1. An antenna coupler set for a radio receiver having a built-in receiving antenna and for use in an automotive vehicle having an outside antenna, said coupler comprising (a) a shielded open top casing of electroconductive material; said casing separate from said vehicle and to be used therein; said receiver to be received in said casing with the loud speaker thereof facing said open top;

(b) an antenna coupler including a ferrite core and an induction coil wound therearound;

(c) a support of insulating material for said ferrite core, said support secured to a wall of said casing so that said ferrite member faces the receiving antenna of said receiver;

(d) means mounting said ferrite core on said support so that said coupler be adjustably positioned in the vicinity of the receiving antenna of said receiver;

(e) plug means through a wall of said casing for connection to said outside antenna;

(f) means connecting one end of said induction coil to said plug and the other end to ground;

(g) padding of resilient material to hold said receiver away from the walls of said casing;

(h) a shielding cover secured over said open top casing and having holes therethrough adapted to face the loud speaker of said radio to allow sound therethrough;

(i) finger well means mounted on and extending through said cover to give access to the control knobs of said radio located along one edge thereof.

2. A coupler set as claimed in claim 1, wherein said ferrite core is a U-shaped member having a central part and two leg parts and said support is a stirrup bracket having a pair of spaced lateral lugs each formed with a half-circular seat facing said portable receiver and adapted to receive the central part of said ferrite member and said mounting means for said ferrite member is a pair of clamping elements each formed with a half-circular seat adapted to receive said central part and mounted in facing relationship with the seats of said lugs, and means removably securing said clamping elements to said lugs whereby to retain said central part in desired orientation of said leg parts of said ferrite core.

3. A radio set as claimed in claim 2, wherein said antenna coupler includes a tuned circuit formed of an inductance coil wound around the central part of said ferrite member and a variable condenser.

References Cited

UNITED STATES PATENTS

| | | | |
|---|---|---|---|
| 2,790,899 | 4/1957 | Townsend | 325—312 |
| 3,230,533 | 1/1966 | Brill | 343—702 |

OTHER REFERENCES

Hoffer: RCA Technical Notes; RCA TN-228; Jan. 5, 1959.

ELI LIEBERMAN, *Primary Examiner.*